Nov. 6, 1962  S. A. STOLWORTHY  3,062,023
COMPENSATING TORQUE SHAFT ASSEMBLY
Filed March 8, 1961
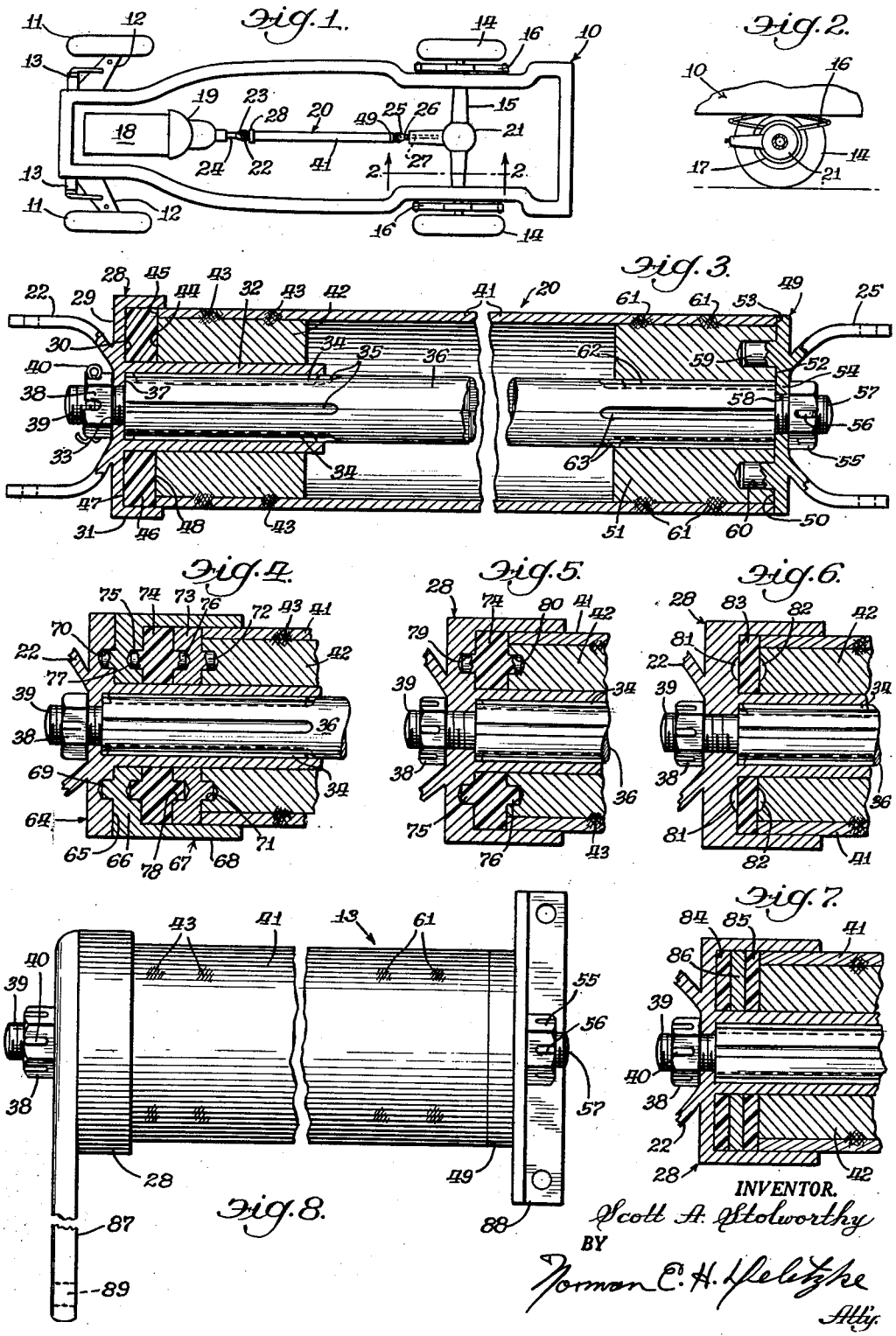
INVENTOR.
Scott A. Stolworthy
BY
Norman C. H. Welitzke
Atty.

United States Patent Office 3,062,023
Patented Nov. 6, 1962

3,062,023
COMPENSATING TORQUE SHAFT ASSEMBLY
Scott A. Stolworthy, 1531 Thatcher Ave.,
River Forest, Ill.
Filed Mar. 8, 1961, Ser. No. 94,288
12 Claims. (Cl. 64—1)

This invention pertains to improvements in torque shaft assemblies adapted for use in transmitting torque and for cushioning or compensating for sudden excessive torque loadings and impulse loadings of such power transmission shafts.

More specifically stated, this invention relates to improvements in a two stage type or double acting type of torque shaft assembly particularly well adapted for use for power transmission in devices or apparatus, wherein excessive torque loading as well as impulse loading may be frequently and suddenly applied from a close coupled source of power or torque, such as a high speed engine, or wherein brakes may be suddenly applied resulting in excessive torque loading of the power transmission unit.

Still more specifically stated, this invention is particularly well adapted for use in motor driven vehicles, as for example, for use as the torque transmission unit intermediate a sub-assembly including a transmission mechanism and a quick acting clutch, such as a dry clutch, and the differential mechanism of the motor vehicle.

The present invention contemplates a new, novel and useful arrangement wherein, due to a unique coupling means, the portion of the torque load which is in excess of that readily transferred by a relatively resilient and main torque shaft, is automatically diverted for transfer to a secondary torque shaft, the combined torque loading capacity of which two torque shafts is greater than any excessive and erratic torque loading which may reasonably be expected under the contemplated operating conditions.

In many conventional torque transmission arrangements, the use of an excessively heavy and rigid torque shaft presents the objectionable operating characteristics of the direct transfer of shock loadings as well as the direct transfer of torque loadings received from the source of power, such as an internal combustion engine. The use of excessively resilient or elastic torque shafts capable of absorbing the shock loadings, normally results in erratic transmission of torque, the development of so-called backlash, undue deflection and wabbling of the torque shaft, and the frequent breakage of such excessively flexible shafts, as well as other objectionable operating conditions, as for example, conditions of dynamic imbalance of the shaft, all of which result in damage to transmission and differential units of the motor vehicle.

In many present day motor vehicles, such as racing cars and relatively light weight cars powered by high speed engines, the use of torque shafts having a relatively high coefficient of resilience or elasticity is desired to avoid the transmission of shock loadings, etc. received from the engine. The backlash characteristics and erratic torque transmission characteristics of such torque shafts are, however, objectionable in that such characteristics frequently produce conditions which result in the loss of traction at precisely the instant when maximum traction is desired, as for example, at the instant of sudden burst of power from the engine or at the instant of extreme emergency braking, and also result in the above mentioned damage to transmission and differential units.

It is a well known fact that in a rear driven type of motor vehicle, such as a high powered racing car, when using an excessively resilient torque shaft and a direct and quick acting clutch, a sudden burst of power will frequently result in the undue twisting, bending and wabbling of the torque shaft and the erratic transmission of torque to the rear drive wheels, causing one of the rear wheels to raise from the track, thereby losing the desired driving traction and also losing the necessary traction required to safely operate the vehicle. Similarly, a sudden and severe application of the brakes in such a vehicle, will, due to the erratic action of an unduly resilient torque shaft, cause the opposite one of the rear wheels to raise from the track, thereby losing the necessary braking traction required to safely operate the vehicle.

In motor vehicles, such as racing cars, wherein the power unit is commonly capable of instantaneously supplying excessive torque loadings to the torque shaft through the commonly used quick acting dry clutch, it is undesirable, for the above stated reasons, to use a heavy and rigid torque shaft which could withstand the strains of the torque loading but which would also transmit the undesirable shock or impulse loading produced by the engine or produced during braking of the vehicle. The use, in such a vehicle, of a sufficiently resilient torque shaft or quill shaft of conventional construction and which would avoid the transmission of the undesirable shock loadings, invariably also introduces the before mentioned objectionable features relating to erratic transmission of the driving torque and the undesirable backlash, deflection and wabble characteristics of such a shaft.

It is therefore an object of this invention to provide an improved compensating type of torque shaft assembly, of the multiple stage torque transmission type, wherein there is provided a first resilient torque shaft having relatively high torsional elasticity or resilience, within predetermined limits of deflection as determined for the contemplated operating conditions, and having a second relatively rigid torque shaft of relatively low torsional elasticity or resilience and capable of absorbing any torque loading in excess of a predetermined torque loading of the first torque shaft, together with a unique coupling mechanism for automatically and drivingly coupling the second torque shaft into the line of power or torque transmission when the torque loading of the first torque shaft has reached a predetermined limit, whereby to avoid the transmission of shock loading and the undesirable deflection, wabble, etc. of the first torque shaft, and to also avoid the erratic transmission of the torque particularly under conditions of sudden burst of excessive power from the engine or the sudden and excessive application of emergency braking, and whereby to attain the even and smooth transmission of torque, as for example, to the driving wheels of a racing type motor vehicle, without the loss of traction.

It is a further objective of this invention to provide an improved compensating type of torque shaft assembly which is comprised of relatively few parts and which is relatively easy to manufacture, which is relatively inexpensive and wherein the unique coupling assembly, which includes easily replaceable elements for operatively coupling the second torque shaft with the first torque shaft upon the occurrence of predetermined conditions of torque loading, is comprised of selectively matched and complementary and readily interchangeable parts which may be easily and quickly assembled or disassembled, whereby to enable the selection of operating characteristics particularly desired with respect to given operating conditions, and whereby to enable the easy and quick repair of the improved unit to maintain maximum operating efficiency.

A further objective of this invention is to provide an improved torque shaft assembly whereby to reduce normal damage to transmission and differential units, whereby to enable more easy shifting of gears when using synchromesh gears in the transmission unit, whereby to avoid slippage between the transmission unit and the differential of the motor vehicle, and whereby to also use the torque coupling sub-assembly of the improved unit as a means for sound-deadening as well as for a protective seal element for the improved unit.

From the foregoing it will be apparent that the various new, novel and useful features of this invention, whereby to attain the foregoing objectives of this invention respecting the improved compensating torque shaft assembly, possess the advantages of inexpensiveness, compactness, simplicity of construction, using only a minimum number of parts which may be easily and quickly assembled and disassembled, interchangeability of matching and complementary parts forming a multiple torque shaft coupling sub-assembly, the ability to evenly and smoothly transmit torque without incurring backlash or erratic torque transmission and without incurring loss of traction, the avoidance of the transmission of impact or shock loading, the avoidance of the undesirable deflection and whipping of the torque shaft having the relatively high coefficient of resilience, adaptability for selective adjustment by the selection of the complementary parts of the connecting or torque coupling sub-assembly to operate efficiently under predetermined conditions of torque loading, the improved conditions for shifting of gears, and the use of the torque coupling sub-assembly as a protective seal and as a sound deadening means.

The foregoing and other objectives, important new, novel and useful features and advantages of this invention will become more apparent and be more easily understood upon examination of the following description thereof and the accompanying drawings and appended claims. It should, however, be remembered that, without desire of limitation, the invention will be described and illustrated as the preferred embodiment of the invention in a compensating torque shaft assembly for a motor vehicle. Certain changes and variations in the invention may, upon review of this application, suggest themselves to those skilled in the pertinent arts, which changes may, however, not depart from the spirit of this invention and may come within the scope of the appended claims.

In the accompanying drawings:

FIGURE 1 is an illustrative plan view of a motor vehicle chassis provided with the improved compensating torque shaft assembly connecting the transmission and clutch sub-assembly of the engine unit of the vehicle with the differential assembly for the rear wheels, and also illustrating the use of a modified form of the improved torque shaft assembly as substitutes for conventional springs for the front wheels of the vehicle;

FIGURE 2 is a longitudinal sectional view taken along line 2—2 of FIGURE 1;

FIGURE 3 is a longitudinal view, partially in section and partially in elevation, of an embodiment of the invention in a compensating torque shaft assembly for a motor vehicle, including one form of compensating torsion coupling assembly for torsionally connecting the inner and the outer torque shafts;

FIGURES 4, 5, 6 and 7 are respectively fragmentary longitudinal views, partially in section and partially in elevation, of modified forms of torsion coupling assemblies for the improved compensating torque shaft assembly; and FIGURE 8 is a plan view of a modified form of the invention embodied in a compensating torsion spring assembly for a motor vehicle.

Referring to the drawings, in which like elements are identified by like numerals, 10, represents the frame of a motor vehicle, for example, a racing car, wherein the front wheels 11 are carried by hinged brackets 12, biased into position of traction by torque spring elements 13. Rear wheels 14, mounted on rear axle 15 support the rear portion of frame 10 through leaf springs 16. Wheels 11 and 14 are provided with conventional brakes 17. The engine unit, including, for example, an internal combustion engine 18 and conventional transmission and a quick acting dry clutch 19, is mounted on the forward portion of frame 10, and is drivingly connected by means of the improved compensating torque shaft assembly 20 to the differential unit 21 comprising part of the rear axle assembly 15. The forward end of torque shaft assembly 20 is provided with a universal joint yoke 22 adapted to be joined, in conventional manner, to a complementary universal joint yoke 23 carried by the power take-off shaft 24 of engine unit 18. The rear end of torque shaft assembly 20, is provided with a universal joint yoke 25 adapted to be joined, in conventional manner, to a complementary universal joint yoke 26 carried by the power absorption shaft 27 extending forwardly from the differential 21.

Referring particularly to FIGURE 3, yoke 22 receives the driving torque and impulse loading through complementary yoke 23 from the power take-off shaft 24. Yoke 22 is integrally formed with torsion transmission cup 28 having a flat, circular and centrally apertured end 29 provided with a flat inner annular or apertured surface 30 and provided with cylindrical side wall 31 perpendicular to the flat face 30. A cylindrical, hollow hub 32, perpendicular to and coaxial with apertured torque transfer surface 30, is formed as an integral part of cup 28 and coaxially circumscribes the central aperture 33 in the end 29 on the side of end 29 opposite yoke or torque conveying means 22. Hub 32 is provided on its inner face with longitudinally extending splines or ribs 34 snugly seated in complementary and longitudinally extending spline grooves 35 in the outer periphery of the adjacent end of a coaxial and cylindrical torsion bar or torsion shaft or quill shaft 36, telescoped into hub 32. End shoulder 37 of shaft 36 is seated against the parallel surface 30 of cup 28 and is securely held thereagainst by nut 38 threaded onto the free end of stud 39 which extends in snug telescopic fit through central aperture 33 in end 29. Key 40 locks the castellated nut 38 on stud 39 in tight engagement with the yoke side surface of end 29 of cup 28. The splined connection between hub 32 and shaft 36 comprises the driving connection between the torsion cup 28 and the torsionally elastic quill shaft 36.

Torque tube 41, which is shorter than shaft 36 and which is relatively rigid and inelastic, is coaxially telescoped over the twistable and shortenable inner shaft 36, with the end thereof adjacent torsion cup 28 closely telescoped into cylindrical flange or cup wall 31, and is radially spaced from hub 32 by the coaxial and cylindrical bushing 42. Bushing 42 is telescoped in free sliding and rotary contact over hub 32 and is welded as at spots 43 to the inner surface of torque tube 41. The outer end 44 of bushing 42 is flush with the end face 45 of torque tube 41 and is parallel to flat annular inner face 30 of the torsion cup 28.

The torque transfer surfaces or faces 44 and 45 which are flush one with another are parallel to and are spaced from the face 30 of cup 28 by a centrally apertured, cylindrical torsion transmitting element 46 coaxially telescoped over hub 32 and into wall 31 and having flat and parallel front and rear faces 47 and 48 respectively. The compressible, annular or washer-like or grommet element 46 is preferably formed of a suitable elastomeric or plastic material such as Teflon, as hereinafter described and its thickness between the parallel sides 47 and 48 is such that when nut 38 is tightened to force shoulder 37 into engagement with face 30, element 46 will be suitably compressed intermediate faces 47 and 48 and wall 31 and hub 32.

The power delivery end adjacent yoke or torque conveying means 25 of the improved compensating torque shaft assembly 20 is comprised of a centrally apertured and cylindrical disc 49 formed integrally with yoke 25. Disc 49 has a diameter equal to the outer diameter of torque tube 41 and has a flat annular inner face 50 perpendicular to the axis of shafts 36 and 41. The power delivery end of torque tube 41 is coaxially spaced from the adjacent end of quill shaft 36 by annular, cylindrical bushing element 51. Bushing 51 is snugly telescoped over shaft 36 and into tube 41. The outer flat end face 52 of bushing 51 is flush with the adjacent flat end face 53 of tube 41 and the shoulder 54 of shaft 36. Flush faces 52, 53 and 54 are parallel to and abut the adjacent inner face 50 of disc 49 which has a diameter equal to the outer diameter of torque tube 41. Faces 52, 53 and 54 are maintained in engagement with face 50 by castellated nut 55 threaded onto and keyed by key 56 to the threaded stud end 57 of shaft 36 which extends outwardly through central aperture 58 in disc 49. Inner face 50 of disc 49 is provided with positioning and driving studs 59 snugly socketed into complementary sockets 60 in the adjacent end of bushing 51. Bushing 51 is spot welded, as at 61, to the inner surface of torque tube 41, and is provided in its central aperture with longitudinally extending splines or ribs 62, snugly seated in complementary spline grooves 63 in the adjacent outer surface of quill shaft 36. As thus assembled, the torque delivery end of the torque shaft assembly comprises a rigid, interlocked arrangement between the associated torque delivery end of shafts 36 and 41 and disc 49, which interlocked arrangement is devoid of any relative rotary movement between the parts thereof.

In the production of the improved compensating torque shaft assembly, the torque bar 36 is preferably formed of laminated steel and has a relatively high torsional elasticity or resilience within predetermined limits of deflection as determined for contemplated operating conditions. The torque tube 41 is comprised of a relatively rigid tube or hollow shaft, of relatively low torsional elasticity or resilience and capable of absorbing torque loadings in excess of predetermined torque loadings beyond the satisfactory operating limits of the torque shaft 36 for the contemplated operating conditions. The torque transfer means or grommet 46 has a constant coefficient of compression and expansion throughout the operating range of compression and/or expansion to which it will be subjected during operation of the improved torque shaft assembly.

In operation, impact loadings will be absorbed by the quill shaft 36. The application of excessive torque to shaft 36, as for example, by a sudden burst of power from engine 18 or the excessive application of the brakes 17, will produce sufficient twisting and consequential shortening of shaft 36 to produce a relative rotary movement between the face 30 of torsion cup 28 and the flush faces 44 and 45 of bushing 42 and torque tube 41. Such relative rotation of such parts and the simultaneous shortening of quill shaft 36 will cause the compression of the torque transmission element 46 and the frictional engagement between the surfaces of the element 46 and the adjacent surfaces of cup 28 and the faces 44 and 45 of bushing 42 and torque tube 41. Such frictional engagement will cause the element 46, under such conditions, to function as a clutching element between the mentioned relatively rotating surfaces and thereby transmit at least part of the torque which causes the relative rotary movement of cup 28 respecting the shaft 41, thereby transferring to shaft 41 the torque loading in excess of a predetermined value with respect to the capacity of the torque shaft 36. Such transfer of the excess torque loading directly from cup 28 to the outer torque tube 41 prevents the undue twisting, deflection, backlash and wabbling of the shaft 36. As soon as the excessive torque loading is diminished or discontinued, the twisting of shaft 36 will be reduced and the shaft 36 will again resume its normal length and axial condition, thereby eliminating the clutching pressure upon torque transmission grommet 46, and torque tube 41 will be relieved of the transmission of torque.

The eliminating of excessive twisting, deflection, backlash and wabble of shaft 36 are important advantages of the present invention, producing improved operating characteristics of the motor vehicle equipped with the improved torque shaft assembly. The avoidance of the erratic transmission of torque, and the avoidance of the transmission of impact loadings, greatly reduces the strain on the transmission differential mechanism and prevents the loss of traction produced when one or the other of the driving wheels is raised from the ground as a result of the sudden application of power or the sudden application of the brakes and the inherent backlash of the conventional torque shaft.

FIGURES 4, 5, 6 and 7, illustrate modified forms of the improved torque coupling arrangements which may be used in the improved compensating torque shaft assembly in place of the cup 28 and grommet 46 as shown in FIGURE 3. In the modification shown in FIGURE 4, hub 32 is integrally formed with cylindrical and centrally apertured end element 64 which is carried on the adjacent end of shaft 36 in the same manner as end element 29 of cup 28 of FIGURE 3. The inner and annular flat face 65 of element 64 is perpendicular to the axis of shaft 36 and is complementary to a parallel adjacent outer face of the apertured base 66 of a cup-shaped element 67 partially telescoped over the adjacent end of torque tube 41. Base 66 of element 67 is telescoped over hub 32 and is provided with longitudinally extending studs 69 socketed in complementary sockets 70 in the adjacent face of disc 64. Face 44 of bushing 42 is provided with sockets 71 for receiving studs 72 on the adjacent complementary inner face of the apertured cylindrical element 73. The washer-shaped, apertured element 73 is telescoped over hub 32 and is provided with parallel inner and outer faces and is telescoped into the cylindrical wall 68 of cup-shaped element 67. The adjacent spaced faces of base 66 and element 67 and element 73 are parallel to face 44 of the bushing 42 and compressively abut against adjacent and complementary and parallel end faces of an annular and plastic torque transmission grommet 74 which is telescoped over hub 32 and which is telescoped into the cylindrical wall 68 of cup-shaped element 67. The spaced and parallel faces of the grommet 74 are provided with studs 75 and 76 which are socketed in sockets 77 and 78 in the adjacent faces of elements 66 and 73 respectively.

When assembled as shown in FIGURE 4, the grommet 74 and the associated elements 67 and 73 function to transmit torque from disc 64 to bushing 42 and torque tube 41 in the same manner and under the same conditions as described above with respect to the grommet 46 shown in FIGURE 3.

In the modification of the invention shown in FIGURE 5, the torque transmission grommet 74 is fitted into cup-shaped torque coupling element 28 with studs 75 socketed in sockets 79 in cup 28 and with studs 76 socketed in sockets 80 in the adjacent flat end face of bushing 42. In other respects the elements of FIGURE 5, are assembled and coact in the same manner as described above with respect to the comparable elements of FIGURE 3.

It should be pointed out that the modification of the invention as shown in FIGURES 4 and 5, may be used with a grommet 74 which does not include the friction increasing means, such as the studs 75 and 76, but which grommet is instead provided with smooth side faces in accordance with the structure of the grommet 46 of FIGURE 3.

The modification of the invention shown in FIGURE 6, differs from the modification of the invention shown in FIGURE 3, in that torque transmission cup 28 is thicker in the modification shown in FIGURE 6 and the grommet 46 shown in FIGURE 6, is correspondingly thinner. The modification shown in FIGURE 6, differs further from the modification of FIGURE 3, in that the inner surface 30 of cup 28 and the adjacent surface 44 of bushing 42, as shown in FIGURE 6, are provided with peening marks or shallow sockets 81 and 82 respectively. Such peening marks will appreciably increase the frictional engagement between the spaced surfaces 30 and 44 and the intermediate and adjacent surfaces of the thin grommet 83 upon the occurrence of excessive torque loading of the shaft 36.

The modification of the invention shown in FIGURE 7, differs from the variant of the invention shown in FIGURE 3, in that the single torque transmission element 46 of FIGURE 3, has been replaced by two similarly formed but appreciably thinner plastic grommets 84 and 85 and a rigid metallic or the like displacement or spacer washer 86 snugly sandwiched in position between the grommets 84 and 85.

All of the modifications of the invention as shown in FIGURES 3-7, function in the same general manner as described with respect to the modification shown in FIGURE 3, and all modifications of the invention may be easily assembled and disassembled. The modification of the invention shown in FIGURE 3, however, contemplates the use of a torque transmission grommet 46 of a specific size with respect to the dimensions of the remaining parts of the assembly, which of necessity determines, at least to an appreciable extent, the operating characteristics of the assembly. The variations of the invention as shown in FIGURES 4-6, contemplate the use of torque transmission coupling elements and grommets of complementary thicknesses to snugly fit between the nut 38 and the bushing 42, whereby to permit the selection of grommet thicknesses to produce the desired torque transmission characteristics under the before mentioned conditions of excess torque loading. The variant of the invention shown in FIGURE 7, accomplished that same objective by employing a spacer or displacement washer 86 intermediate the torque transmission grommets 84 and 85. The relative thickness of the elements 84, 85 and 86 are so selected as to achieve the desired objective of torque transmission under the mentioned conditions of torque loading.

FIGURE 8 illustrates a modification or adaptation of the invention shown in FIGURES 3-7 for use as a torque spring. Yoke 22 has been replaced by a lever 87 and yoke 25 has been replaced by a bracket 88 rigidly secured to the disc 49. Bracket 88 may be secured, as by bolts or rivets, to a fixed support (not shown) and a suitable linkage (not shown) may be secured into aperture 89 at the free end of lever 87 for the application of a twisting force to the shaft 36 forming part of the assembly shown in FIGURE 8. The application of such a force to lever 87, tending to rotate lever 87 with respect to the torque tube 41, will produce the same reaction of the elements of the torque spring assembly as described above with respect to the variant of the invention shown in FIGURE 3.

From the foregoing description of this invention and from the accompanying drawings, it will be apparent that this invention realizes the introductorily enumerated objectives respecting the improved compensating torque shaft assembly. It will similarly be apparent that the invention possesses the hereinbefore listed advantages and provides new, novel and useful improvements in compensating torque shaft assemblies.

Having thus described and illustrated the preferred embodiments of this invention, the invention is not to be interpreted as being restricted to the specifically illustrated and described embodiments, as set forth in the drawings and as hereinbefore described, except insofar as is necessitated by the appended claims and the disclosures of the prior art.

The invention is hereby claimed as follows:

1. A torque transmission assembly, comprising, in combination, a twistable and shortenable first torque shaft, a second torque shaft coaxially telescoped over said first torque shaft, joining means rigidly joining two adjacent ends of said first torque shaft and said second torque shaft, and torsion coupling means coupling the opposite two adjacent ends of said first torque shaft and said second torque shaft, said torsion coupling means comprising a first torque transfer surface carried by said first torque shaft and a second torque transfer surface carried by said second torque shaft, and compressible means intermediate said first torque transfer surface and said second torque transfer surface, said first torque transfer surface being relatively rotatable and axially movable with respect to said second torque transfer surface upon the twisting and consequential shortening of said first torque shaft with respect to said second torque shaft to compress said compressible means intermediate said first torque transfer surface and said second torque transfer surface, whereby operative torque transfer relation is established between said opposite two adjacent ends of said first torque shaft and said second torque shaft when the twisting and shortening of said first torque shaft attains a predetermined degree and torsional force is then transferred from said first torque shaft to said second torque shaft.

2. A torque transmission assembly, comprising, in combination, a rotatable inner and relatively flexible and twistable and shortenable first shaft means, a rotatable outer and relatively rigid second shaft means, joining means rigidly joining two adjacent ends of said two shaft means, torque transfer first surface means operatively joined to said first shaft means and disposed at an angle to the axis of said first shaft means, torque transfer second surface means operatively joined to said second shaft means and disposed at an angle to the axis of said first shaft means, and torque transfer means intermediate said first surface means and said second surface means, whereby rotary driving relation between said first surface means and said second surface means is established when said first shaft means is twisted and shortened a predetermined degree with respect to said second shaft means to compressively engage said coupling means intermediate said first surface means and said second surface means responsive to said twisting and shortening of said first shaft means.

3. A motor vehicle, comprising, in combination, a source of torque including a clutch unit and a transmission unit, torque absorption means including a differential unit and traction wheels and brake means operatively connected to said traction wheels, and torque transmission means operatively joining said source of torque and said torque absorption means, said torque transmission means including a torsionally elastic first torque shaft which is twistable and shortenable upon the application of torque thereto and which first torque shaft has rotatively fixed connections at its opposite ends with said source of torque and with said torque absorption means, a second torque shaft which is relatively inelastic compared to said first torque shaft and which is coaxially telescoped over said first torque shaft and which is rotatably fixed at its one end to said first torque shaft and which is operatively joined at its opposite end to said first torque shaft by torque transfer coupling means, said torque transfer coupling means comprising a torque transfer first surface means operatively joined to said first torque shaft and disposed at an angle to the axis of said first torque shaft and torque transfer second surface means operatively joined to said second torque shaft and disposed at an angle to the axis of said first torque shaft and torque transfer means intermediate said first surface means and said second surface means, whereby rotary driving relation between said first surface means and said second surface means is established when said first torque shaft is twisted and shortened a predetermined degree with respect to said second torque shaft to compressively engage said transfer means intermediate said first surface means and said second surface means responsive to the twisting and shortening of said first torque shaft as produced by the application of a torsional force to said torque transmission means intermediate said clutch unit and said differential unit.

4. A torque transmission assembly, comprising, in combination, a cylindrical and torsionally elastic first torque shaft, a cylindrical second torque shaft which is relatively torsionally inelastic compared to said first torque shaft and which is telescoped over said first torque shaft, cylindrical and rigid first bushing means snugly telescoped coaxially into one end of said second torque shaft and permanently and rigidly fixed thereto and snugly telescoped coaxially over and releasably keyed to an adjacent end of said first torque shaft in rotatively fixed position with respect thereto, first torque conveying means and motion limiting means operatively and releasably joined to said first bushing means and operatively and releasably joined to said first torque shaft in axially fixed position with respect thereto and adapted to limit the axial movement in one direction of said second torque shaft, cylindrical and rigid second bushing means snugly telescoped coaxially into the opposite end of said second torque shaft and permanently and rigidly fixed thereto, cylindrical and rigid hub means snugly telescoped coaxially into said second bushing means for free relative rotary movement with respect thereto and snugly telescoped coaxially over the adjacent end of said first torque shaft and releasably keyed to said first torque shaft in axial and rotatively fixed position with respect thereto, flat annular and rigid first surface means comprised of the outer end of said second bushing means and the adjacent end of said second torque shaft and disposed perpendicular to the axis of said first torque shaft, flat annular and rigid second surface means integrally formed with and extending radially outwardly from the outer end of said hub means and parallel to and spaced axially from said first surface means, annular torque transfer means having spaced flat and parallel end faces and snugly telescoped over and coaxially carried by said hub means with said spaced flat and parallel end faces complementary to and in compressive engagement respectively with said first surface means and said second surface means, hollow and cylindrical retaining means integrally formed with and carried by said second surface means coaxially with said hub means and snugly telescoped over a complementary cylindrical outer peripheral surface on said torque transfer means and slidingly telescoped over the adjacent end of said second torque shaft, and second torque conveying means operatively joined to said hub means.

5. A torque transmission assembly according to claim 4, wherein said second surface means is provided with an axial aperture through which the adjacent and threaded end of said first torque shaft extends, shoulder means on said first torque shaft engaging one side of said second surface means about the aperture therein, and a nut threaded onto said threaded end of said first torque shaft and engaging said second surface means on the side thereof opposite said shoulder means.

6. A torque transmission assembly according to claim 5, wherein said first bushing means is provided interiorly thereof with longitudinally extending ribs and said first torque shaft is provided with longitudinally extending grooves for receiving said ribs formed within said first bushing means for locking said first bushing means and said first torque shaft in fixed relative rotary position with respect to their adjacent surfaces, and wherein said hub means is provided interiorly thereof with longitudinally extending ribs and said first torque shaft is provided with longitudinally extending grooves for receiving said ribs formed within said hub means for locking said hub means and said first torque shaft in fixed relative rotary position with respect to their adjacent surfaces.

7. A torque transmission assembly, comprising, in combination, a torsionally elastic first torque shaft adapted to be twisted and to shorten as torque is applied thereto, a torsionally inelastic second torque shaft coaxially telescoped over said first torque shaft and having a first end thereof releasably joined to the adjacent first end of said first torque shaft in fixed relative rotary position with respect to said first end of said first torque shaft, first torque conveying means operatively joined to said first end of said first torque shaft and to said first end of said second torque shaft, annular torque transfer first surface means releasably keyed to a second end of said first torque shaft in fixed relative rotary position and in fixed axial position with respect to said second end of said first torque shaft and extending outwardly from said first torque shaft, annular torque transfer second surface means parallel to and spaced from said first surface means and fixed to a second end of said second torque shaft in fixed relative rotary position and fixed axial position with respect to said second end of said second torque shaft, and annular compressible torque transfer means positioned intermediate said first surface means and said second surface means and having parallel opposite faces complementary to and compressively engaging respectively the adjacent one of said first surface means and said second surface means, and second torque conveying means operatively joined to said second end of said first torque shaft and to said first surface means, whereby when sufficient torque is applied to said assembly intermediate said first torque conveying means and said second torque conveying means said first torque shaft will twist and shorten to rotatively and axially move said first surface means with respect to said second surface means and axially compress said compressible torque transfer means and transfer torsional force between said first surface means and said second surface means.

8. A torque transmission assembly according to claim 7, wherein said first surface means and said second surface means are provided with surface irregularities to increase the frictional engagement respectively between said first surface means and said second surface means and the adjacent faces of said compressible torque transfer means.

9. A torque transmission assembly according to claim 8, wherein said compressible torque transfer means is provided with surface irregularities on its opposite faces complementary to the surface irregularities in the adjacent one of said first surface means and said second surface means.

10. A torque transmission assembly according to claim 7, wherein said compressible torque transfer means is comprised of a plurality of compressible annular elements positioned on opposite sides of a relatively noncompressible annular element and having parallel outer faces of said compressible annular elements compressively engaging the adjacent complementary one of said first surface means and said second surface means.

11. A torque transfer mechanism, comprising, in combination, an inner torsionally elastic first shaft adapted to twist and to shorten a predetermined amount responsive to the application thereto of a predetermined degree of torque, an outer torsionally substantially inelastic second shaft, a torque transfer first surface member carried by one end of said first shaft in fixed position axially and rotatively with respect to that end of said first shaft and extending outwardly from said first shaft, a torque transfer second surface member carried by an adjacent end of said second shaft in fixed position axially and rotatively with respect to that end of said second shaft and extending outwardly from said first shaft and axially spaced from said first surface member, and torque transfer means intermediate said first surface member and said second surface member, whereby upon the application of a predetermined degree of torque to said first shaft said first shaft will twist and shorten a predetermined amount and a positive driving relation will be provided between said first shaft and said second shaft responsive to the relative axial movement between said first surface member and said second surface member.

12. A mechanism according to claim 11, wherein said torque transfer means comprises an elastomeric body axially compressed between said first surface member and said second surface member.

References Cited in the file of this patent

UNITED STATES PATENTS

| | | |
|---|---|---|
| 810,412 | Hobbs | Jan. 23, 1906 |
| 993,570 | Webster | May 30, 1911 |
| 2,395,183 | Holmstorm | Feb. 19, 1946 |

FOREIGN PATENTS

| | | |
|---|---|---|
| 263,229 | Great Britain | Dec. 14, 1926 |
| 302,625 | Great Britain | Dec. 17, 1928 |